United States Patent
Kawanishi

(10) Patent No.: US 8,866,029 B2
(45) Date of Patent: Oct. 21, 2014

(54) LINK APPARATUS, WEIGHING APPARATUS USING A LINK APPARATUS, PACKAGING APPARATUS USING A LINK APPARATUS AND WEIGHING AND PACKAGING SYSTEM USING A LINK APPARATUS

(76) Inventor: Shozo Kawanishi, Nishinomiya (JP)

(*) Notice: Subject to any disclaimer, the term of this patent is extended or adjusted under 35 U.S.C. 154(b) by 1374 days.

(21) Appl. No.: 12/531,478

(22) PCT Filed: Mar. 12, 2008

(86) PCT No.: PCT/JP2008/000548
§ 371 (c)(1),
(2), (4) Date: Jan. 14, 2011

(87) PCT Pub. No.: WO2008/129777
PCT Pub. Date: Oct. 30, 2008

(65) Prior Publication Data
US 2011/0094621 A1    Apr. 28, 2011

(30) Foreign Application Priority Data
Mar. 16, 2007 (JP) .................................. 2007-068992

(51) Int. Cl.
*G01G 13/24* (2006.01)
*B65B 43/42* (2006.01)
(Continued)

(52) U.S. Cl.
CPC .............. *B65B 39/145* (2013.01); *B65B 37/18* (2013.01); *B65B 1/32* (2013.01); *B65B 43/60* (2013.01); *B65B 9/087* (2013.01); *G01G 19/393* (2013.01)
USPC ................... 177/55; 177/53; 177/54; 141/83; 141/144; 141/145; 141/185

(58) Field of Classification Search
CPC .......... B65B 1/30; B65B 1/32; B65B 39/007; B65B 39/14; B65B 39/145; G01G 19/387; G01G 19/393
USPC ............. 141/10, 83, 94, 135, 144, 145, 168, 141/177, 179, 270, 146–149, 178, 181, 185, 141/186; 177/52, 54–57, 59, 58, 53
See application file for complete search history.

(56) References Cited

U.S. PATENT DOCUMENTS 2,920,737 A * 1/1960 Engleson et al. ............. 198/458
3,786,844 A * 1/1974 Smearsoll et al. ................ 141/8
(Continued)

FOREIGN PATENT DOCUMENTS

DE    196 01 207 A1    7/1997
JP    49-29273    8/1974
(Continued)

OTHER PUBLICATIONS

International Search Report for PCT/JP2008/000548, mailed Jun. 10, 2008.
(Continued)

*Primary Examiner* — Timothy L Maust
(74) *Attorney, Agent, or Firm* — Marshall, Gerstein & Borun LLP

(57) ABSTRACT

A link apparatus supplies objects discharged from a weighing machine to package bags being conveyed successively at a high speed and comprises plural hopper groups each including n hoppers; and plural arms configured to convey an associated hopper group along a revolving path including a first area where the objects are supplied to the hopper group and a second area under which package bags are conveyed successively. The arms convey the hopper groups from the first area to the second area in a predetermined order, the n hoppers sequentially conveyed to the second area are located above the n package bags conveyed to a region under the second area; the hoppers are located above the package bags in the second area, and the hopper groups are stopped in the first area. The hopper groups discharge the objects, when the hopper groups are conveyed in the second area.

9 Claims, 8 Drawing Sheets

(51) Int. Cl.
  *B65B 37/18* (2006.01)
  *B65B 1/32* (2006.01)
  *G01G 19/393* (2006.01)
  *B65B 39/14* (2006.01)
  *B65B 43/60* (2006.01)
  *B65B 9/087* (2012.01)

(56) References Cited

U.S. PATENT DOCUMENTS

| | | | | |
|---|---|---|---|---|
| 4,420,051 A | * | 12/1983 | Furuta et al. | 177/25.12 |
| 4,574,849 A | * | 3/1986 | Fukuda | 141/1 |
| 5,455,395 A | * | 10/1995 | Hafner | 177/145 |
| 5,564,482 A | * | 10/1996 | Grat et al. | 141/133 |
| 5,854,446 A | * | 12/1998 | Tatsuoka et al. | 177/17 |
| 5,889,235 A | * | 3/1999 | Kawanishi et al. | 177/25.18 |
| 6,179,021 B1 | * | 1/2001 | McFall | 141/248 |
| 6,262,377 B1 | * | 7/2001 | Nielsen et al. | 177/1 |
| 6,625,961 B1 | * | 9/2003 | Ogier et al. | 53/502 |
| 6,662,930 B2 | * | 12/2003 | Yester | 198/502.1 |
| 6,787,712 B2 | * | 9/2004 | Asai et al. | 177/25.18 |
| 6,814,108 B1 | * | 11/2004 | Brandt, Jr. | 141/83 |
| 7,073,658 B2 | * | 7/2006 | Biancoli et al. | 198/757 |
| 7,732,717 B2 | * | 6/2010 | Fujii | 177/25.18 |
| 8,119,935 B2 | * | 2/2012 | Kawanishi | 177/25.18 |
| 8,230,887 B2 | * | 7/2012 | Poole et al. | 141/2 |
| 2008/0128245 A1 | * | 6/2008 | Arthaud | 198/419.3 |
| 2010/0132833 A1 | * | 6/2010 | Kawanishi | 141/98 |

FOREIGN PATENT DOCUMENTS

| | | |
|---|---|---|
| JP | 2004-099136 | 4/2004 |
| WO | WO-03/047977 A2 | 6/2003 |
| WO | WO-2006/033290 | 3/2006 |

OTHER PUBLICATIONS

Extended European Search Report for European Patent Application No. 08720434.3, dated May 6, 2013.

* cited by examiner

LINK APPARATUS, WEIGHING APPARATUS USING A LINK APPARATUS, PACKAGING APPARATUS USING A LINK APPARATUS AND WEIGHING AND PACKAGING SYSTEM USING A LINK APPARATUS

TECHNICAL FIELD

The present invention relates to a link apparatus for linking a weighing machine such as a combination weigher to a packaging machine for carrying out packaging while successively conveying package bags, a weighing apparatus using the link apparatus, a packaging apparatus using the link apparatus, and a weighing and packaging system using the link apparatus.

BACKGROUND ART

Conventionally, there is a weighing and packaging system which charges objects to be packaged having a fixed volume into package bags conveyed successively in a line shape to manufacture package products (e.g., see patent document 1). FIG. 8 shows an example of such a conventional weighing and packaging system. FIG. 8(a) is a side view of the conventional weighing and packaging system. FIG. 8(b) is a plan view showing major components of the weighing and packaging system.

The weighing and packaging system includes a packaging machine 20 and a powder material supplying device 50 for supplying a powder material as objects to be packaged. In the packaging machine 20, an elongate film P is wound back from a film roll (not shown), horizontally conveyed successively via several rollers, and bent in a watershoot shape to have a fold line at a lower side through a film guide 21. The lower end portions of feeding funnels 23 are sequentially inserted into a space of the two-fold film P1. Then, sealing bars 22 (fixing/heating bars 22a, tilting levers 22b) sequentially sandwich the two-fold film from both sides such that heating surfaces of the fixing/heating bars 22a thermally seal the film with a small width in a width direction of the film, thereby forming side seal portions P2 at constant intervals. A number of package bags P3 defined by the side seal portions P2 are formed successively in the longitudinal direction of the film. The package bags P3 are conveyed successively with the lower end portions of the feeding funnels 23 inserted into openings formed at the upper edges of the package bags P3.

The powder material is supplied from the powder material supplying device 50 located above with a constant amount through the openings of measuring cups 54 and is charged into the respective package bags P3 via the feeding funnels 23. The powder material supplying device 50 includes a hopper 51 storing the powder material, a rotary container 52 which receives the powder material through the lower end opening of the hopper 51 and has a flat bottom plate 53, plural tubular measuring cups 54 having a constant volume and penetrating downward through the periphery of the bottom plate 53, a measuring board (not shown) which is fixed on the bottom plate 53 and positioned in close proximity to the upper end opening surfaces of the measuring cups 54 to charge the powder material into the measuring cups 54 precisely up to the upper edges thereof, and shutters 55 for opening and closing the lower end opening surfaces of the measuring cups 54.

The film charged with the powder material in the package bags P3 by the powder material supplying device 50 is conveyed successively and passes through a turn-back roller 24. An upper edge sealing device 25 thermally seals the upper edge portions of the package bags P3 successively to form upper edge seal portions P4, thereby sealing the package bags. The film is further conveyed, and a cutting device 26 perforates the side seal portions P2 to form seams, or cuts them, so that the package bags P3 are sequentially cut and separated away from each other. Thus, the package products are manufactured.

Patent document 1: Japanese Laid-Open Patent Application Publication No. 2004-99136

DISCLOSURE OF THE INVENTION

Problems to be Solved by the Invention

In the above described conventional weighing and packaging system, in the packaging machine 20, the package bags P3 with the lower end portions of the feeding funnels 23 inserted therein are conveyed successively at a high speed, and the rotary container 52 of the powder material supplying device 50 continuously rotates. Thereby, the measuring cups 54 for supplying the powder material to the package bags P3 and the feeding funnels 23 inserted into the package bags P3 move in a state where the measuring cups 54 and the feeding funnels 23 overlap in the vertical direction, in a package bag charging area IV. This makes it possible to supply the powder material from the measuring cups 54 to the package bags P3 conveyed at a high speed through the feeding funnels 23 during the movement.

However, in the weighing machine such as the combination weigher which weighs the objects to be weighed such that its weight falls within a predetermined weight range and discharge them, the position of a discharge outlet for the objects to be weighed is fixed. Therefore, it is difficult to supply the objects to be weighed to the packaging machine 20 which successively conveys the package bags at a high speed as described above. The above described packaging machine 20 is configured to convey the package bags successively so as to draw a circular arc. It is also difficult to supply from the weighing machine the objects to be weighed to a packaging machine which is configured to successively convey the package bags at a high speed in a straight-line shape.

The present invention has been developed to solve the above mentioned problem, and an object of the present invention is to provide a link apparatus which is capable of supplying objects to be weighed which have been discharged from a weighing machine having a discharge outlet provided in a fixed position to package bags being conveyed successively at a high speed, a weighing apparatus using the link apparatus, a packaging apparatus using the link apparatus, and a weighing and packaging system using the link apparatus.

Means for Solving the Problem

To achieve the above described object, a link apparatus of the present invention comprises plural hopper groups each including n (n: plural number) hoppers for holding objects to be weighed which are supplied to the hoppers and discharging the objects to be weighed; and plural conveyor means which are provided to respectively correspond to the hopper groups and are respectively configured to convey the hopper groups such that the hoppers belonging to each hopper group are arranged in one line in a direction along a revolving path including a first area where the objects to be weighed are supplied to the n hoppers belonging to the hopper group and a second area under which package bags arranged in one line in the direction along the revolving path are conveyed successively, the first area being a part of the revolving path and the second area being another part of the revolving path; wherein the conveyor means are respectively configured to convey the hopper groups such that the hopper groups are repeatedly conveyed from the first area to the second area in a predetermined order; the conveyor means are respectively configured to convey associated hopper groups such that the n hoppers in each of the hopper groups sequentially conveyed to the second area are respectively located above the n package bags sequentially conveyed to a region under the second area; and the conveyor means are respectively configured to convey the hopper groups such that the n hoppers in each of the hopper groups are respectively located above the n package bags in the second area; the conveyor means are respectively configured to stop the hopper groups in the first area or conveys the hopper groups in the first area at a speed lower than a speed in the second area; and wherein the hopper groups are each configured to discharge the objects to be weighed from the n hoppers to the n package bags respectively located below the n hoppers, when the hopper groups are conveyed in the second area.

In accordance with such a configuration, plural hopper groups each including the n hoppers which are conveyed along the revolving path are provided, the hopper groups are in a stopped state or are conveyed at a slow speed in the first area. Therefore, the objects to be weighed which have been discharged from the weighing machine having a discharge outlet in a fixed position can be supplied to each of the hoppers in the hopper group. In the second area, each of the hoppers in the hopper group discharges the objects to be weighed, while the hopper group is conveyed such that the hoppers are respectively located above the n package bags arranged successively. Thus, the objects to be weighed can be supplied to each of the package bags. Therefore, the objects to be weighed which have been discharged from the weighing machine having a discharge outlet in a fixed position can be supplied to the package bags being conveyed successively at a high speed.

The number of the hopper groups may be three or more and the number of the conveyor means may be three or more.

By providing three or more hopper groups and providing three or more conveyor means, a hopper group holding the objects to be weighed and being conveyed from the first area to the second area can be located between a hopper group which is supplied with the objects to be weighed in the first area and a hopper group which supplies the objects to be weighed to the package bags in the second area. Therefore, even if the supply of the objects to be weighed to the hopper group is retarded in the first area, the hopper group being conveyed from the first area to the second area is subsequently conveyed to the second area and supplies the objects to be weighed to the package bags. Thus, it is possible to avoid that the supply of the objects to be weighed to the package bags is retarded. In addition, in a case where the weighing machine has a capability of higher-speed supply of the objects to be weighed to the hopper group in the first area, a discharge cycle of the objects to be weighed of the weighing machine is shortened and the conveying speed of the hopper groups on a part of the revolving path other than the first area and the second area is made higher, increasing the number of hopper groups being conveyed from the first area to the second area, even if the number of hoppers being conveyed from the first area to the second area is reduced.

It is preferable that the n hoppers in each hopper group are mounted to the conveyor means such that the hoppers are arranged at a pitch equal to a pitch of the package bags arranged, in the direction along the revolving path.

The conveyor means may be configured to convey the hopper groups at a speed equal to a speed at which the package bags are conveyed in the second area.

A weighing apparatus of the present invention comprises the above link apparatus of the present invention; and a weighing machine having n discharge outlets disposed above the first area of the link apparatus, the weighing machine being configured to discharge the objects to be weighed which have been weighed from the respective discharge outlets to supply the objects to be weighed to the hoppers in each of the hopper groups which are conveyed sequentially to the first area of the link apparatus.

In accordance with such a configuration, it is possible to supply the objects to be weighed which have been discharged from the weighing machine having the discharge outlets in fixed positions to the package bags being conveyed successively at a highspeed, by using the link apparatus of the present invention.

The weighing machine may be configured to divide the objects to be weighed into plural groups and weigh the objects to be weighed for each of the plural groups, determine n combinations each having a total weight falling within a predetermined weight range, from the groups for which the objects to be weighed have been weighed, and configured to discharge, from the n discharge outlets, the objects to be weighed in the groups which are selected to form the n combinations.

A packaging apparatus of the present invention comprises the above link apparatus of the present invention; and a packaging machine which successively conveys the package bags arranged in one line under the second area of the link apparatus.

In accordance with such a configuration, it is possible to supply the objects to be weighed which have been discharged from the weighing machine having the discharge outlets in fixed positions to the package bags being conveyed successively at a high speed, by using the link apparatus of the present invention.

A weighing and packaging system of the present invention comprises the above link apparatus of the present invention; a weighing machine having n discharge outlets disposed above the first area of the link apparatus, the weighing machine being configured to discharge the objects to be weighed which have been weighed from the respective discharge outlets to supply the objects to be weighed to the hoppers in each of the hopper groups which are conveyed sequentially to the first area of the link apparatus; and a packaging machine which successively conveys the package bags arranged in one line under the second area of the link apparatus.

In accordance with such a configuration, it is possible to supply the objects to be weighed which have been discharged from the weighing machine having the discharge outlets in fixed positions to the package bags being conveyed successively at a high speed, by using the link apparatus of the present invention.

The packaging machine may include plural funnels which are conveyed under the second area of the link apparatus in a state where the funnels are respectively inserted into the package bags and guide the objects to be weighed which have been discharged from the hoppers of the link apparatus to inside of the package bags.

Thereby, the objects to be weighed which have been discharged from the hoppers are supplied to the package bags through the funnels. Thus, the objects to be weighed easily enter the package bags.

Effects of the Invention

The present invention has the above described configuration and achieves advantages that it is possible to provide a link apparatus which is capable of supplying the objects to be weighed which have been discharged from the weighing machine having the discharge outlets in fixed positions to the package bags being conveyed successively at a high speed, a weighing apparatus using the link apparatus, a packaging apparatus using the link apparatus, and a weighing and packaging system using the link apparatus.

The above and further objects, features and advantages of the present invention will more fully be apparent from the following detailed description of preferred embodiments with accompanying drawings.

Figure 1:
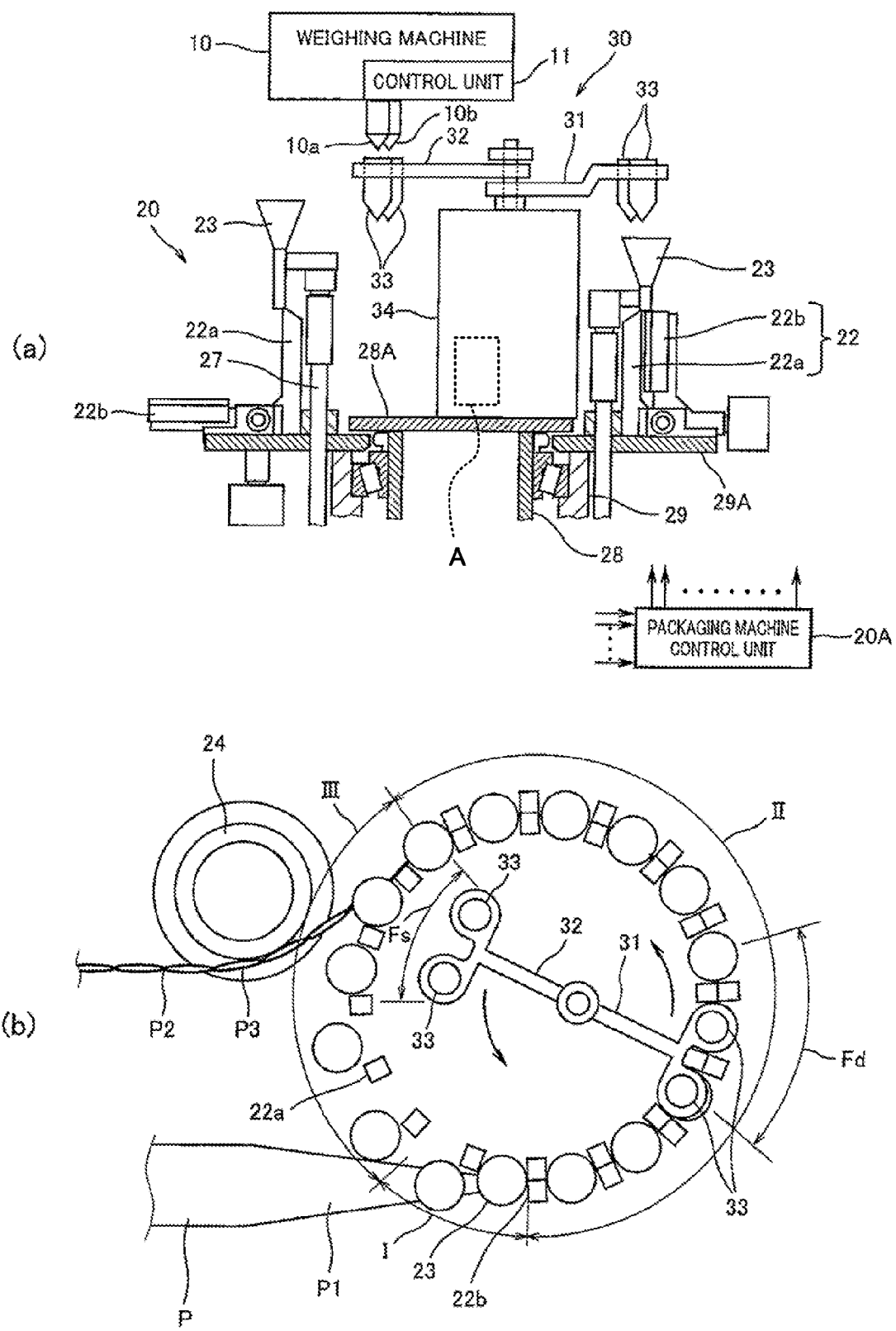
FIG. 1(a) is a side view showing a schematic configuration of major components of a weighing and packaging system using a link apparatus according an embodiment of the present invention.
FIG. 1(b) is a plan view schematically showing major components of the weighing and packaging system.

EXPLANATION OF REFERENCE NUMERALS 10 weighing machine
10a, 10b discharge outlet of weighing machine
11 control unit of weighing machine
20 packaging machine
20A packaging machine control unit
23 feeding funnel
30 link apparatus
31, 32 arm
33 hopper
34 drive unit

BEST MODE FOR CARRYING OUT THE INVENTION

Hereinafter, preferred embodiments of the present invention will be described with reference to the drawings.

FIG. 1(a) is a side view showing a schematic configuration of major components of a weighing and packaging system using a link apparatus according an embodiment of the present invention, and FIG. 1(b) is a plan view schematically showing major components of the weighing and packaging system.

The weighing and packaging system of this embodiment comprises a weighing machine 10 constituted by, for example, a combination weigher, a packaging machine 20, and a link apparatus 30.

The link apparatus 30 includes arms 31 and 32 which are respectively independently driven. Two hoppers 33 are attached to each of the tip end portions of the arms 31 and 32 to hold objects to be weighed which have been supplied thereto and to discharge them. When the aims 31 and 32 rotate, the two hoppers 33 are brought to a reserving area Fs and the weighing machine 10 discharges the objects to be weighed to the two hoppers 33 through discharge outlets 10a and 10b. Each hopper 33 has a discharge gate (hereinafter simply referred to as a "gate") for discharging the objects to be weighed which have been supplied thereto in a downward direction. The gate is similar to a known gate used in a feeding hopper or the like of a combination weigher described later.

The weighing machine 10 has the two discharge outlets 10a and 10b. Through the respective discharge outlets 10a and 10b, the objects to be weighed (e.g., powder material such as sugar) having a weight within a specified weight range are discharged. The discharge outlets 10a and 10b are respectively positioned above the two hoppers 33 located in the reserving area Fs. When the two hoppers 33 are in the reserving area Fs, i.e., are non-moving in the reserving area Fs, the objects to be weighed are discharged simultaneously through the two discharge outlets 10a and 10b and are supplied to the two hoppers 33.

The packaging machine 20 has a configuration similar to that of the conventional example. The packaging machine 20 is configured such that plural sealing bars 22 (fixing/heating bars 22a, tilting levers 22b) revolve while opening and closing, and the plural feeding funnels 23 revolve while moving up and down and being swung inward and outward.

In the packaging machine 20, as shown in FIG. 1, a rotary tubular body 29 is supported to a fixed cylindrical base 28 such that the rotary tubular body 29 is rotatable around the cylindrical base 28, and is driven to rotate.

The plural sealing bars 22 are mounted to a ring-shaped board 29A fixed to an upper end of the rotary tubular body 29 so that the side seal portions P2 of the film P1 are formed at a predetermined pitch. The sealing bars 22 revolve around the rotary tubular body 29 according to the rotation of the rotary tubular body 29. During the revolving movement of the sealing bars 22, when the tilting seal bars 22b are closed, the fixing/heating bars 22a and the tilting seal bars 22b sandwich the film P1 and the heating surfaces of the fixing/heating bars 22a thermally seal the film with a small width in a width direction of the film, thereby forming the side seal portions P2. When the tilting seal bars 22b are opened, the film P1 can be separated away from the fixing/heating bars 22a.

The feeding funnels 23 are mounted to up-down shafts 27 by arms fixed to the upper end portions of the up-down shafts 27. The up-down shafts 27 are inserted into through-holes provided at a predetermined pitch in the ring-shaped board 29A at the upper end of the rotary tubular body 29 and revolve around the rotary tubular body 29 according to the rotation of the rotary tubular body 29. The up-down shafts 27 are configured to be movable up and down and to be rotatable while revolving. Thereby, the feeding funnels 23 revolve along with the up-down shafts 27 to which the feeding funnels 23 are mounted. When the up-down shafts 27 move up and down, the feeding funnels 23 move up and down, while when the up-down shafts 27 rotate, the feeding funnels 23 are swung inward or outward.

The packaging machine 20 includes a packaging machine control unit 20A. The packaging machine control unit 20A is constituted by, for example, a microcomputer and controls the operation of the entire packaging machine 20.

In the packaging machine 20, the elongate film P is wound back from the film roll (not shown), horizontally conveyed successively via several rollers, and bent in a watershoot shape to have a fold line at a lower side through the film guide 21 (see FIG. 8), forming the two-fold film P1. Meanwhile, the feeding funnels 23 revolve and move up in an area III, where the feeding funnels 23 are swung outward. Thereafter, in an area I, the feeding funnels 23 are swung inward while moving down, allowing the lower end portions of the feeding funnels 23 to be sequentially inserted into a space of the two-fold film P1. The feeding funnels 23 move in the same direction that the film P1 moves.

Then, in an area II, the feeding funnels 23 are maintained in a down position and the tilting seal bars 22*b* are sequentially closed. Thereby, the sealing bars 22 sequentially sandwich the two-fold film P1 from both sides to form the side seal portions P2 at constant intervals, so that a number of package bags P3 are formed successively in the longitudinal direction of the film such that the package bags are defined by the side seal portions P2 and their upper edge portions are open. The feeding funnels 23 are maintained in a state where the lower end portions thereof are inserted into the openings at the upper edge portions of the package bags P3.

Within the area II where the feeding funnels 23 are in the down position, the objects to be weighed which have been discharged from the weighing machine 10 and have been reserved in the hoppers 33 are charged into the package bags P3 through the feeding funnels 23, by opening the gates of the hoppers 33, during a period in which the hoppers 33 of the link apparatus 30 are located right above the feeding funnels 23 (package bag charging area Fd).

Figure 8:
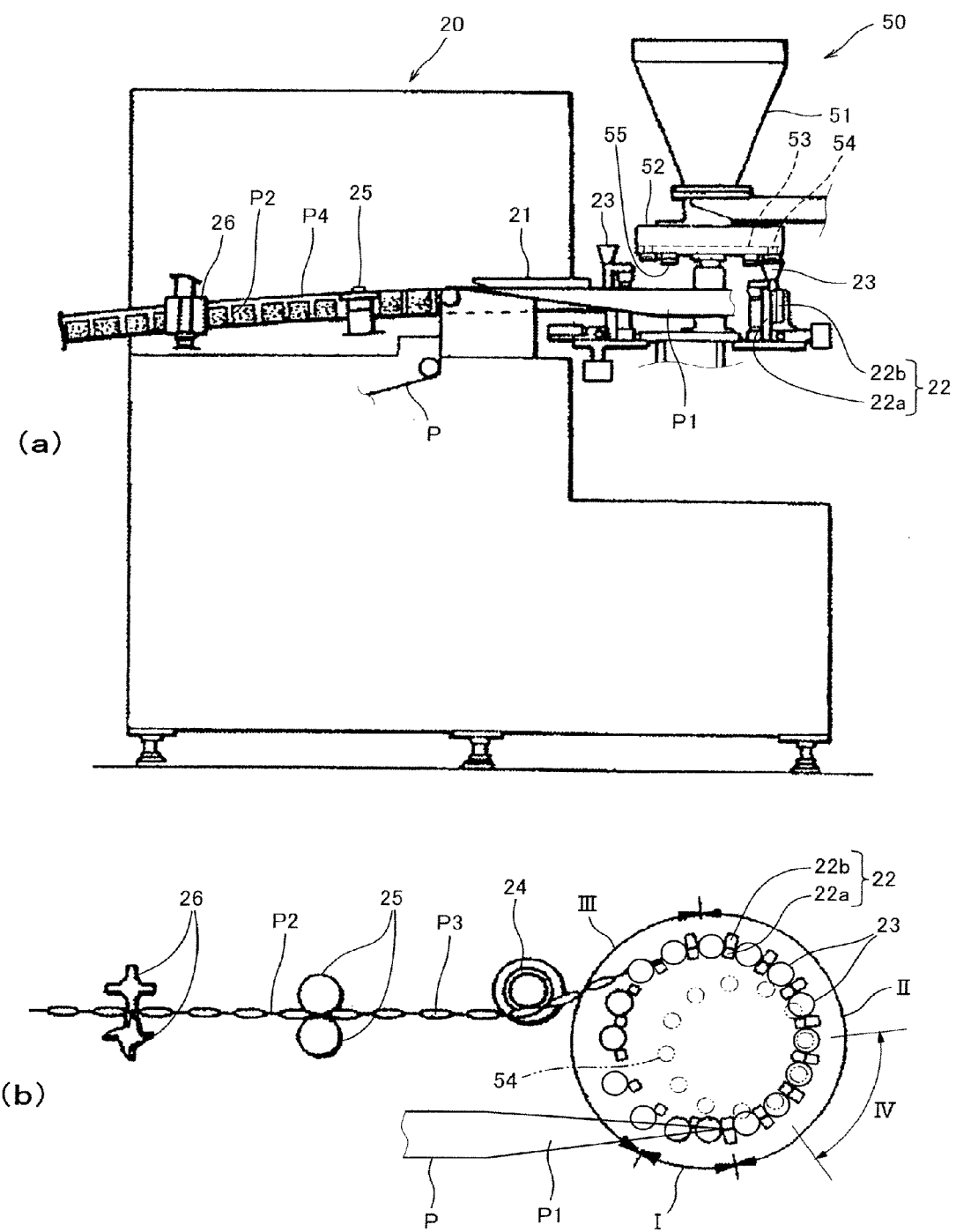
FIG. 8(a) is a side view of a conventional weighing and packaging system.
FIG. 8(b) is a plan view showing major components of the weighing and packaging system.

The film, the package bags P3 of which have been charged with the objects to be packaged (in this embodiment, the objects to be weighed which have been discharged from the weighing machine 10) in the package bag charging area Fd, are conveyed successively. In the area III, the feeding funnels 23 move up and the tilting seal bars 22*b* are open, so that the film is separated away from the fixing/heating bars 22*a*. Then, the film passes through the turn-back roller 24. Then, as shown in FIG. 8, the upper edge sealing device 25 thermally seals the upper edge portions of the package bags P3 successively to form the upper edge seal portions P4, sealing the package bags. Then, the film is further conveyed, and the cutting device 26 perforates the side seal portions P2 to form seams, or cuts them, so that the package bags P3 are sequentially cut and separated away from each other. Thus, the package products are manufactured.

The link apparatus 30 is fixed on a horizontal board 28A mounted to the upper end of the cylindrical base 28 of the packaging machine 20. The link apparatus 30 includes the plural arms 31 and 32 which are rotatable around their one end portions thereof, the plural hoppers 33 attached to the other end portion of each of the arms 31 and 32, and the drive unit 34 for rotating the arms 31 and 32. Herein, the two arms 31 and 32 are provided, and the two hoppers 33 are attached to each of the arms 31 and 32 by threaded engagement, welding, etc. Each hopper 33 has a gate for discharging from inside the objects to be weighed which have been discharged from the weighing machine 10.

Figure 2:
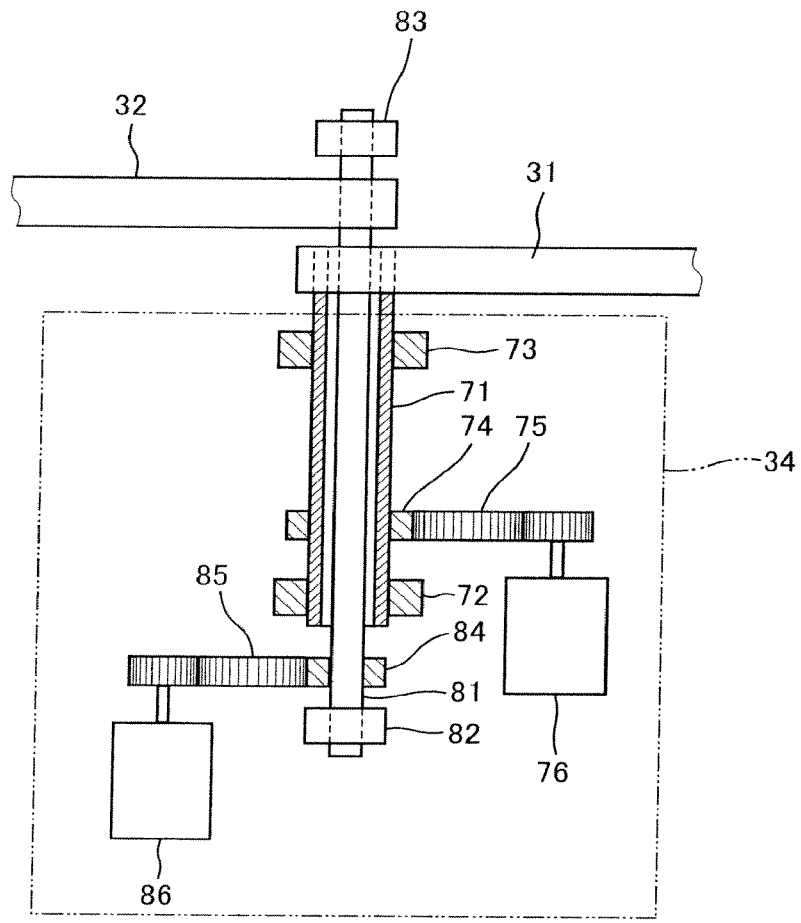
FIG. 2 is a view showing an example of an internal structure of a drive unit of a link apparatus.

FIG. 2 is a view showing an example of an internal structure of the drive unit 34. The arm 32 is attached to a rotary shaft 83. The rotary shaft 81 is retained by two bearings 82 and 83 such that the rotary shaft 81 is rotatable around an axis thereof. A gear 84 is mounted on the rotary shaft 81. The gear 84 is coupled to a motor 86 via a gear 85. When the motor 86 rotates, the rotary shaft 81 rotates, causing the arm 32 to rotate. The arm 31 is attached to a rotary tubular body 71 into which a rotary shaft 81 is inserted. The rotary tubular body 71 is retained by two bearings 72 and 73 such that the rotary tubular body 71 is rotatable around the rotary shaft 81. A gear 74 is mounted on the rotary tubular body 71. The gear 74 is coupled to a motor 76 via a gear 75. When the motor 76 rotates, the rotary tubular body 71 rotates, causing the arm 31 to rotate. The bearings 82 and 83 and the bearings 72 and 73 are respectively fixed by members which are not shown. To enable acceleration and deceleration control of the rotational speeds of the arms 31 and 32, servo motors are used as the motors 76 and 86, for example.

The two hoppers 33 are attached to the arm 31 such that they revolve along the same circumference according to the rotation of the arm 31, while the two hoppers 33 are attached to the arm 32 such that they revolve along the same circumference according to the rotation of the arm 32.

As shown in FIG. 1(*b*), in the package bag charging area Fd, the revolving path of the hoppers 33 overlaps with the conveying path of the feeding funnels 23. Therefore, in the package bag charging area Fd, the hoppers 33 pass through above the conveying path of the feeding funnels 23. The arrangement pitch of the two hoppers 33 attached to each of the arms 31 and 32 is set equal to the arrangement pitch (=arrangement pitch of the package bags P3) of the feeding funnels 23 passing through the package bag charging area Fd.

Each of the arms 31 and 32 rotates in a direction indicated by an arrow in FIG. 1(*b*). In the package bag charging area Fd, each of the arms 31 and 32 rotates so that the hoppers 33 are conveyed while maintaining a state where the hoppers 33 are respectively located right above the feeding funnels 23. In this case, each of the arms 31 and 32 rotates so that he conveying speed of the hoppers 33 is equal to or substantially equal to the conveying speed (=conveying speed of the package bags P3) of the feeding funnels 23. In the reserving area Fs, the rotation of each of the arms 31 and 32 is stopped to stop the hoppers 33. The arms 31 and 32 are each rotated such that the hoppers 33 are conveyed from the reserving area Fs to the package bag charging area Fd and from the package bag charging area Fd to the reserving area Fs at a speed higher than the speed at which the hoppers 33 are conveyed in the package bag charging area Fd. The rotational speed of the motor 76 and the rotational speed of the motor 86 are respectively controlled so that the associated arms 31 and 32 operate in this manner.

A control circuit (referred to as a control circuit A) for controlling the operation of the drive unit 34 is built into the drive unit 34 of the link apparatus 30. The control circuit A includes a control circuit for the motors 76 and 86 for driving the aims 31 and 32 and a control circuit for controlling the opening and closing operation of the gates of the hopper 33.

A control unit 11 of the weighing machine 10 is constituted by, for example, a microcomputer, and is configured to control the operation of the link apparatus 30 via the control circuit A as well as the operation of the entire weighing machine 10.

The operation speed (driving speed: e.g., the number of package bags manufactured per minute=the number of times the objects to be weighed corresponding to one package bag are discharged per minute) is set in the control unit 11 using an input means (not shown) of the weighing machine. The control unit 11 controls the weighing machine 10 and the link apparatus 30 so that the weighing machine 10 and the link apparatus 30 operate according to the set operation speed.

The control unit 11 outputs a specified signal (hereinafter referred to as a "weighing operation signal") to the packaging machine control unit 20A at a specified timing in the operation repeated in the weighing machine 10, for example, when the weighing machine 10 is ready to discharge the objects to be weighed, or discharges the objects to be weighed. Thus, the weighing operation signal is output to the packaging machine control unit 20A in an operation cycle (cycle: TM) according to the operation speed, while the normal operation is performed.

The operation speed (driving speed: e.g., the number of package bags manufactured per minute) is set in the packaging machine control unit 20A using an input means (not shown) of the packaging machine. The packaging machine control unit 20A controls the packaging machine 20 according to the set operation speed. The feeding funnels 23 are conveyed at a predetermined speed according to the operation speed along with the package bags P3 within the area II.

The packaging machine control unit 20A outputs a specified signal (hereinafter referred to as a "packaging operation signal") to the control unit 11 of the weighing machine at a specified timing in the operation repeated in the packaging machine 20, for example, when the tilting seal bars 22b are sequentially closed. Thus, the packaging operation signal is output to the control unit 11 of the weighing machine in the operation cycle (cycle: Tp) according to the operation speed, while the normal operation is performed.

In a case where an equal operation speed (driving speed) is set in the control unit 11 of the weighing machine 10 and in the packaging machine control unit 20A, the operation cycle (TM) of the weighing machine 10 is twice as long as the operation cycle (Tp) of the packaging machine 20, because the weighing machine 10 discharges the objects to be weighed corresponding to two package bags in one operation cycle. Conversely, the operation cycle (Tp) of the packaging machine 20 is ½ as long as the operation cycle (TM) of the weighing machine 10.

The packaging machine control unit 20A checks whether or not the weighing operation signal is received from the weighing machine 10 once in every time which is twice as long as the operation cycle (Tp) of the packaging machine 20, and causes the packaging machine 20 to continue the operation. If the weighing operation signal is retarded, the packaging machine control unit 20A causes the packaging machine 20 to temporarily stop the operation (stand-by) until the weighing operation signal is received.

The control unit 11 of the weighing machine 10 checks whether or not the packaging operation signal is received from the packaging machine 20 once in every time which is ½ as long as the operation cycle (TM) of the weighing machine 10, and causes the weighing machine 10 and the link apparatus 30 to continue the operation. If the packaging operation signal is retarded, the control unit 11 causes the weighing machine 10 and the link apparatus 30 to temporarily stop the operation (stand-by) until the packaging operation signal is received.

The operation start position and the operation stop position are preset in the link apparatus 30 and the packaging machine 20. The operation start position and the operation stop position are set, for example, as shown in the state of FIG. 1(b), that is, so that the feeding funnels 23 are located right under the hoppers 33 in the package bag charging area Fd. During the operation of the weighing and packaging system, an equal operation speed (driving speed) is set in the control unit 11 of the weighing machine 10 and in the packaging machine control unit 20A.

In accordance with the setting, in the packaging machine 20, the feeding funnels 23 and the package bags P3 are conveyed at a constant speed according to the set operation speed. In the link apparatus 30, in the package bag charging area Fd, the two hoppers 33 are conveyed while maintaining a state where the two hoppers 33 are located right above the feeding funnels 23 and the gates of the two hoppers 33 are opened. Outside the package bag charging area Fd, the gates of the hoppers 33 are closed. It is sufficient that the gates of the two hoppers 33 are closed in a period from when the two hoppers 33 exit the reserving area Fs until the hoppers 33 reach the package bag charging area Fd. The two hoppers 33 are conveyed from the package bag charging area Fd to the reserving area Fs and from the reserving area Fs to the package bag charging area Fd at a speed higher than the speed at which the hoppers 33 are conveyed in the package bag charging area Fd.

Figure 3:
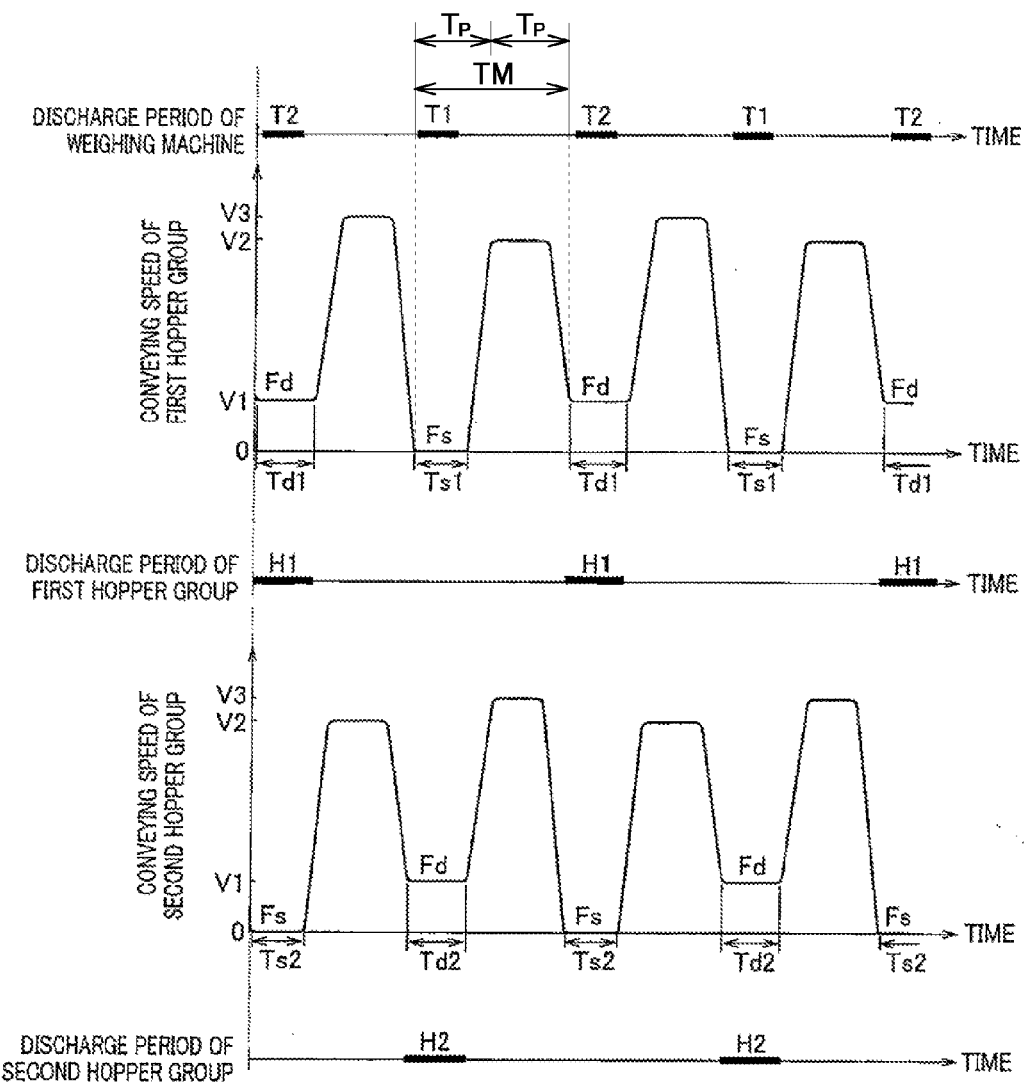
FIG. 3 is a timing chart showing an example of the operation of a weighing machine and the operation of the link apparatus.

FIG. 3 is a timing chart showing an example of the operation of the weighing machine 10 and the operation of the link apparatus 30. It is supposed that in the packaging machine 20, the operation occurs in a constant operation cycle (Tp: manufacture time of one package). Supposing that the weighing machine 10 discharges the objects to be weighed in a constant operation cycle (TM), the operation cycle (TM) of the weighing machine 10 is a period which is twice as long as the operation cycle (Tp) of the packaging machine 20, because the objects to be weighed corresponding to two package bags are discharged in one discharge period of the weighing machine 10.

Hereinafter, the two hoppers 33 attached to the arm 31 are referred to as a first hopper group, while the two hoppers 33 attached to the arm 32 are referred to as a second hopper group.

Initially, the operation of the first hopper group will be described. In a period Ts1, the first hopper group is in a stopped state in the reserving area Fs. In this period, the weighing machine 10 supplies the objects to be weighed (discharge period T1 of the weighing machine). After the period Ts1, the first hopper group is conveyed to the package bag charging area Fd at a speed V2 higher than a speed V1. In a following period Td1, the first hopper group is conveyed at the speed V1 and opens the gates of the hoppers 33 to discharge the objects to be weighed in the package bag charging area Fd (discharge period H1 of the first hopper group). Thereafter, the first hopper group is conveyed to the reserving area Fs at a speed V3 higher than the speed V1 and are stopped there. Thereafter, similar operation is repeated.

The same occurs in the second hopper group. In a period Ts2, the second hopper group is in a stopped state in the reserving area Fs. In this period, the weighing machine 10 supplies the objects to be weighed (discharge period T2 of the weighing machine). After the period Ts2, the second hopper group is conveyed to the package bag charging area Fd at the speed V2 higher than the speed V1. In a following period of Td2, the second hopper group is conveyed at the speed V1 and opens the gates of the hoppers 33 to discharge the objects to be weighed in the package bag charging area Fd (discharge period H2 of the second hopper group). Thereafter, the second hopper group is conveyed to the reserving area Fs at the speed V3 higher than the speed V1 and are stopped there. Thereafter, similar operation is repeated.

The first hopper group and the second hopper group operate at different timings. In the example of FIG. 3, when the first hopper group is in the reserving area Fs, the second hopper group is in the package bag charging area Fd, while when the first hopper group is in the package bag charging area Fd, the second hopper group is in the reserving area Fs.

The conveying speed V1 of the hoppers 33 in the package bag charging area Fd is equal to or substantially equal to the conveying speed of the feeding funnels 23 and the package bags P3 in the packaging machine 20. In the package bag charging area Fd, the two hoppers 33 are conveyed in the state where the two hoppers 33 are respectively located right above the feeding funnels 23 of the packaging machine.

As described above, the weighing machine 10 and the link apparatus 30 operate synchronously with the operation of the packaging machine 20. Thereby, for example, for the package bags P3 which are being conveyed successively in the packaging machine 20, the first hopper group supplies the objects to be weighed to the successive two package bags P3, the second hopper group supplies the objects to be weighed to the following two package bags P3, and the first hopper group supplies the objects to be weighed to the following two package bags P3. Thus, the hopper groups sequentially supply the objects to be weighed to the package bags P3 such that each hopper group supplies the objects to be weighed to the two package bags P3.

In the above example, the weighing machine 10 discharges the objects to be weighed simultaneously through the two discharge outlets 10a and 10b, it may discharge the objects to be weighed sequentially through the two discharge outlets 10a and 10b.

Figure 4:
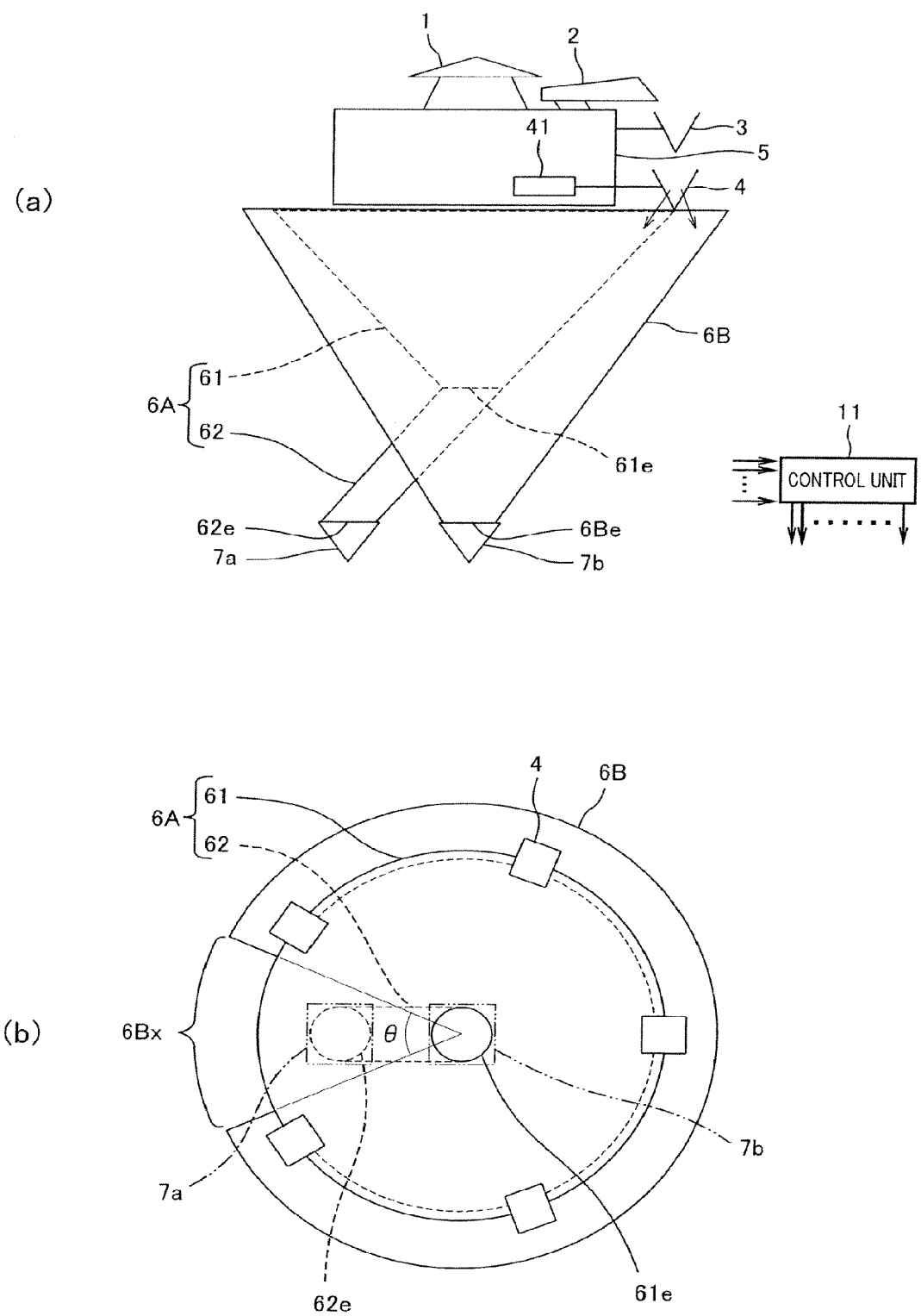
FIG. 4(a) is a schematic view of a weighing machine having two discharge outlets as viewed from the side, which is partly in cross-section.
FIG. 4(b) is a schematic view of an inner chute, an outer chute, and weighing hoppers of the weighing machine as viewed from above.

FIG. 4 shows an example of the weighing machine 10 having two discharge outlets 10a and 10b.

FIG. 4(a) is a schematic view of the weighing machine 10 having the two discharge outlets as viewed from the side, which is partly in cross-section, and FIG. 4(b) is a schematic view of an inner chute, an outer chute, and weighing hoppers of the weighing machine 10 as viewed from above.

The weighing machine 10 shown in FIG. 4 is a combination weigher. As shown in FIG. 4(a), a dispersion feeder 1 having a conical shape is mounted to an upper part of a center base body (body) 5 provided at a center of the machine to radially disperse by vibration the objects to be weighed supplied from an external supplying device. Around the dispersion feeder 1, plural linear feeders 2 are provided to transfer by vibration the objects to be weighed which have been received from the dispersion feeder 1 into respective feeding hoppers 3. Plural feeding hoppers 3 and plural weighing hoppers 4 are disposed below the linear feeders 2 and are arranged in a circular-arc shape around the center base body 5 in such a manner that each feeding hopper 3 and each weighing hopper 4 correspond to the associated one of the linear feeders 2. The dispersion feeder 1, the linear feeders 2, the feeding hoppers 3 and the weighing hoppers 4 are mounted to the center base body 5. Each weighing hopper 4 is attached with a weight sensor 41 such as a load cell for measuring the weight of the objects to be weighed inside the weighing hopper 4. Each weight sensor 41 outputs a measurement value to the control unit 11.

As shown in FIG. 4(b), the feeding hoppers 3 and the weighing hoppers 4 are arranged in a circular-arc shape in a region except for a region corresponding to a central angle θ, and the linear feeders 2 are disposed to respectively correspond to the feeding hoppers 3.

An inner chute 6A and an outer chute 6B are disposed below the weighing hoppers 4 arranged in a circular-arc shape. Each weighing hopper 4 is configured to have a gate for discharging the objects to be weighed to the inner chute 6A and a gate for discharging the objects to be weighed to the outer chute 6B to selectively discharge the objects to be weighed to the inner chute 6A or to the outer chute 6B.

The outer chute 6B has a structure in which a chute having a substantially inverted conical shape is provided with a cut portion 6Bx corresponding to the portion where no weighing hopper 4 is provided. A collecting hopper 7b is provided at a discharge outlet 6Be at a bottom part thereof. The objects to be weighed are discharged from the weighing hoppers 4 to the outer chute 6B, slide down on the outer chute 6B, and are held for some time in the collecting hopper 7b. After that, the objects to be weighed are discharged.

The inner chute 6A includes a chute 61 which is disposed inside the outer chute 6B and has a substantially inverted conical shape, and a pipe 62 which is a tubular chute provided at a discharge outlet 61e of the chute 61. The pipe 62 is disposed to pass through the cut portion 6Bx of the outer chute 6B such that a discharge outlet 62e thereof is located below the cut portion 6Bx outside the outer chute 6B. A collecting hopper 7a is provided at the discharge outlet 62e of the pipe 62. The objects to be weighed are discharged from the weighing hoppers 4 to the inner chute 6A, slide down on the chute 61, pass through the pipe 62, and are held for some time in the collecting hopper 7a. After that, the objects to be weighed are discharged.

In this case, the control unit 11 controls the operation of the entire combination weigher and the operation of the link apparatus, and performs a combination process. In the combination process, the control unit 11 performs combination calculation based on the weight values of the objects to be weighed inside the weighing hoppers 4 which are measured by the respective weight sensors 41 to determine two combinations (discharge combinations) of the weighing hoppers 4 in which a total of the weight values of the objects to be weighed falls within a predetermined weight range (allowable range with respect to a target weight value) from among the plural weighing hoppers 4, and determines one of the discharge combinations as a combination for discharging the object to be weighed to the inner chute 6A and the other as a combination for discharging the object to be weighed to the outer chute 6B.

In the combination weigher, the objects to be weighed are supplied from the external supplying device to the dispersion feeder 1 and are supplied from the dispersion feeder 1 to each feeding hopper 3 via the associated liner feeder 2. Each feeding hopper 3 feeds the objects to be weighed to the associated weighing hopper 4. The weight sensor 41 measures the weight of the objects to be weighed which have been fed to each weighing hopper 4, and outputs a measurement value to the control unit 11. The control unit 11 performs the combination process to determine two discharge combinations simultaneously. The control unit 11 causes the weighing hoppers 4 forming one discharge combination to discharge the objects to be weighed to the inner chute 6A, and at the same time, causes the weighing hoppers 4 forming the other discharge combination to discharge the objects to be weighed to the outer chute 6B. Thereby, the objects to be weighed are supplied to the collecting hoppers 7a and 7b. The feeding hopper 3 feeds the objects to be weighed to the weighing hopper 4 which has discharged the objects to be weighed and is now empty. The liner feeder 2 feeds the objects to be weighed to the feeding hopper 3 which is empty.

The control unit 11 causes the collecting hoppers 7a and 7b to simultaneously discharge the objects to be weighed at a specified timing.

The collecting hoppers 7a and 7b of the combination weigher serve as the discharge outlets 10a and 10b of the weighing machine 10 of FIG. 1. The objects to be weighed which have been discharged from the collecting hoppers 7a and 7b are supplied to the two hoppers 33 of the link apparatus 30 in the reserving area Fs. Thereafter, in the package bag charging area Fd, the hoppers 33 respectively charge the objects to be weighed to the package bags P3 via the feeding funnels 23 of the packaging machine 20.

Whereas in the above described combination weigher, the two discharge combinations are determined simultaneously, the discharge combination for discharging the objects to be weighed to the inner chute 6A and the discharge combination for discharging the objects to be weighed to the outer chute 6B may be determined sequentially, the weighing hoppers 4 forming the respective discharge combinations may sequentially discharge the objects to be weighed, and the respective collecting hoppers 7a and 7b may sequentially discharge the objects to be weighed.

In the link apparatus 30 of this embodiment, plural (two in the example of FIG. 1) hopper groups each including n (n:plural: two in the example of FIG. 1) hoppers 33 conveyed along the revolving path are provided, and the conveying of the hopper groups is stopped in the reserving area Fs (first area). Therefore, the objects to be weighed which have been discharged from the discharge outlets 10a and 10b of the weighing machine 10 having discharge outlets in fixed positions can be supplied to the respective hoppers 33 in each hopper group. In the package bag charging area Fd (second area), the hopper group is conveyed such that the hoppers 33 of the hopper group are respectively located above the n package bags P3 arranged successively and the hoppers 33 discharge the objects to be weighed, enabling the supply of the objects to be weighed to the respective package bags P3. Therefore, the objects to be weighed which have been discharged from the weighing machine 10 having the discharge outlets in the fixed positions can be supplied to the package bags P3 being conveyed successively at a high speed.

In the link apparatus 30, the drive unit 34 shown in FIG. 2 is configured to control the rotational speeds of only the motors 76 and 86 to control the rotational speeds of the rotary shaft 83 and the rotary tubular body 71, in order to control the conveying speed of the hoppers 33 attached to the respective arms 31 and 32. Alternatively, the drive unit 34 may be configured to control the rotational speeds of the rotary shaft 83 and the rotary tubular body 71 using a motor and a cam, respectively. In this case, the speed control of the motor may be carried out or the rotational speeds of the rotary shaft 83 and the rotary tubular body 71 may be controlled by a cam operation. Or, the rotational speeds of the rotary shaft 83 and the rotary tubular body 71 may be controlled by a cam operation, under the condition in which the rotational speed of the motor is constant.

The hoppers 33 may be configured to revolve along an endless conveyer belt such as a chain. For example, plural sprockets may be disposed in predetermined positions, the endless conveyer belt such as a chain may be set in the plural sprockets, plural hopper retaining members respectively retaining the hoppers 33 may be coupled to the endless conveyer belt at constant intervals, and a part of the sprockets may be driven by a motor such as a servo motor which is capable of speed control. A guide rail or the like may be provided to guide the hopper retaining members so that the hoppers 33 stably pass along a predetermined revolving orbit. In this case, for example, two configurations each using the above described endless conveyer belt are required instead of the configuration using the two arms 31 and 32, etc.

In the case of using the above described conveyor belt, the revolving orbit of the hoppers 33 is not limited to a circular orbit, but may be an oval orbit or other orbits.

In the case of using a packaging machine configured to convey the package bags in a straight-line shape successively at a high speed, the hoppers 33 may be configured to revolve along the endless conveyer belt such as the chain as described above.

Each hopper group may include three or more hoppers 33. In this case, for example, the weighing machine 10 has three or more discharge outlets.

Furthermore, three or more hopper groups may be provided.

Subsequently, an example of the above described modification will be described.

FIG. 5(a) is a plan view showing a schematic configuration of a link apparatus having three hopper groups each including three hoppers in a case where a packaging machine is configured to convey package bags in a straight-line shape and FIG. 5(b) is a partial cross-sectional view of the link apparatus.

The link apparatus includes a hopper group including three hoppers 33 respectively attached to hopper retaining members 94 coupled to a chain 91, a hopper group including three hoppers 33 respectively attached to hopper retaining members 95 coupled to a chain 92, and a hopper group including three hoppers 33 respectively attached to hopper retaining members 96 coupled to a chain 93. The arrangement pitch of the hoppers 33 in each hopper group is equal to the arrangement pitch (=arrangement pitch of the package bags P3) of the feeding funnels 23 of the packaging machine. In the package bag charging area Fd, the hopper group is conveyed in a X-direction at a speed equal to the conveying speed (=conveying speed of the package bags P3) of the feeding funnels 23 in a state where the hoppers 33 are respectively located right above the feeding funnels 23.

In this case, for example, the three chains 91 to 93 are disposed so as to overlap with each other with a specified gap in the vertical direction and so as to extend along inside the revolving orbit of the hoppers 33. The hopper holding members 94 to 96 each holding the hoppers 33 are coupled to the upper sides of the chains 91 to 93, respectively such that three sets of each of the hopper holding members 94 to 96 are arranged at constant intervals. A guide rail 97 is provided to slidably retain end portions of the hopper retaining members 94 to 96 which are at an opposite side of the end portions of the hopper retaining members 94 to 96 which are respectively coupled to the chains 91 to 93. For example, the hopper retaining members 94 and 96 are plate-like members provided with openings which serve to retain the associated hoppers 33. The hoppers 33 are respectively fastened to the hopper retaining members 94 to 96 by an appropriate method (e.g., welding or threaded engagement). The guide rail 97 is located outside along the revolving orbit of the hoppers 33. For example, as shown in FIG. 5(b), the guide rail 97 has a U-shaped cross section and the end portions of the hopper retaining members 94 to 96 which are at an opposite side of the end portions thereof respectively coupled to the chains 91 to 93 are inserted into the U-shaped recess (groove) and are slidably retained therein. The chains 91 to 93 are set by plural sprockets (not shown) or the like as shown in FIG. 5(a), and a part of the sprockets may be driven by a motor such as a servo motor which is capable of speed control.

Figure 5:
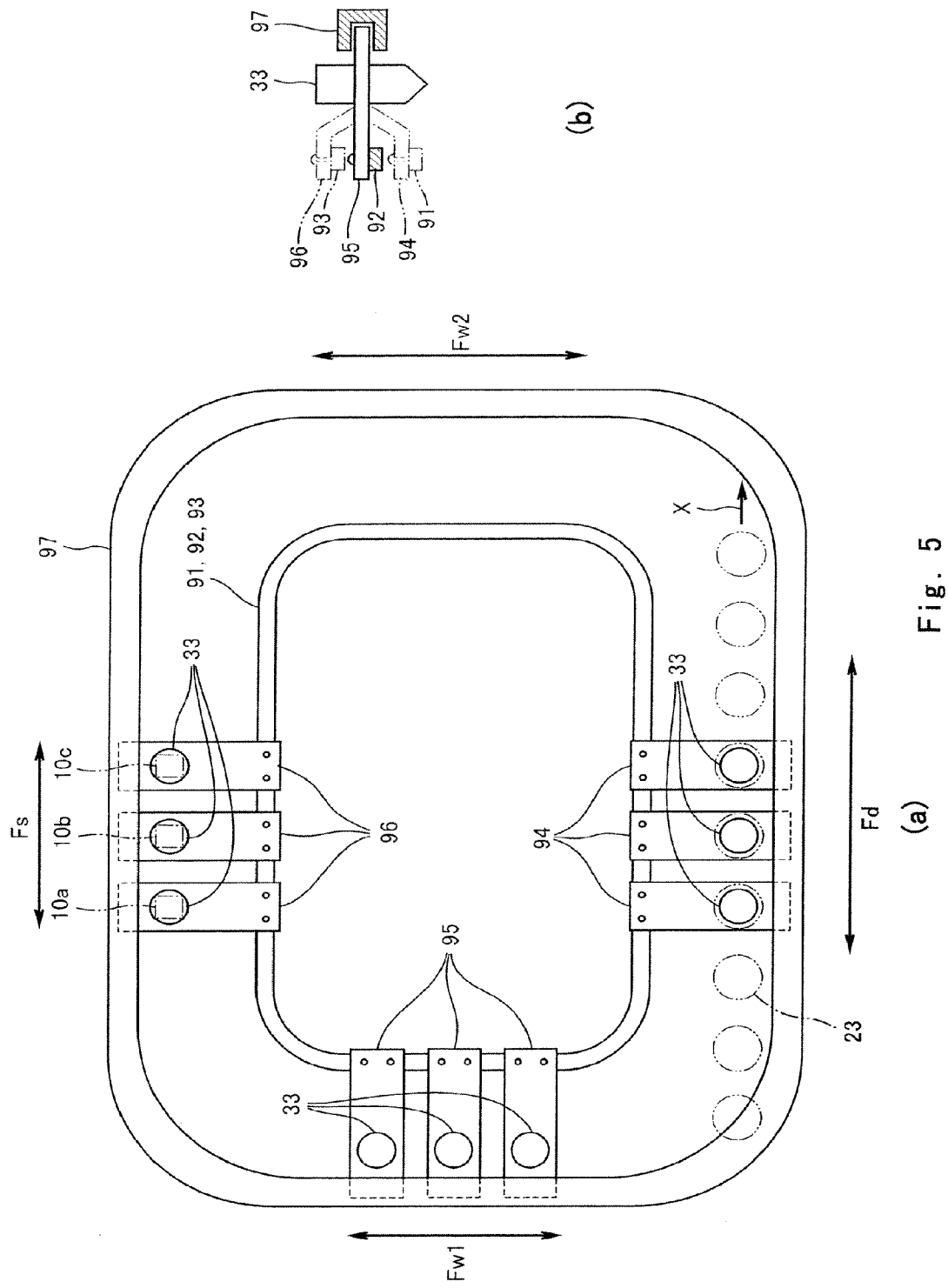
FIG. 5(a) is a plan view showing a schematic configuration of a link apparatus having three hopper groups each including three hoppers in a case where a packaging machine is configured to convey package bags in a straight-line shape.
FIG. 5(b) is a partial cross-sectional view of the link apparatus.

In the example of FIG. 5, a first stand-by area Fw1 is provided in a location of a region on the revolving path of the hoppers 33, where the hoppers 33 are conveyed from the reserving area Fs to the package bag charging area Fd, while a second stand-by area Fw2 is provided in a location of a region on the revolving path of the hoppers 33, where the hoppers 33 are conveyed from the package bag charging area Fd to the reserving area Fs. The three discharge outlets 10a, 10b, and 10c of the weighing machine are disposed above the hoppers 33 which are in a stopped state in the reserving area Fs.

The detail of the operation timing will be described later with reference to FIG. 6. The schematic operation in a normal state will be described. Initially, in the reserving area Fs, the objects to be weighed are discharged simultaneously through the three discharge outlets 10a, 10b and 10c of the weighing machine and are supplied to the three hoppers 33.

Then, the three hoppers 33 holding the objects to be weighed are conveyed at a high speed to the first stand-by area Fw1. In the first stand-by area Fw1, the hoppers 33 are for example, in a stopped state. The hoppers 33 are conveyed to the package bag charging area Fd when preceding hoppers 33 staying in the package bag charging area Fd exit the package bag charging area Fd.

In the package bag charging area Fd, the hoppers 33 are conveyed at a speed equal to the speed of the feeding funnels 23 in a X-direction so that the hoppers 33 are respectively located right above the feeding funnels 23. At this time, the gates of the hoppers 33 are opened. By opening the gates of the hoppers 33, the objects to be weighed which have been reserved in the hoppers 33 are discharged and are charged into the package bags (not shown) through the feeding funnels 23. The three hoppers, which have discharged the objects to be weighed, are conveyed to the package bag charging area Fd.

Figure 6:
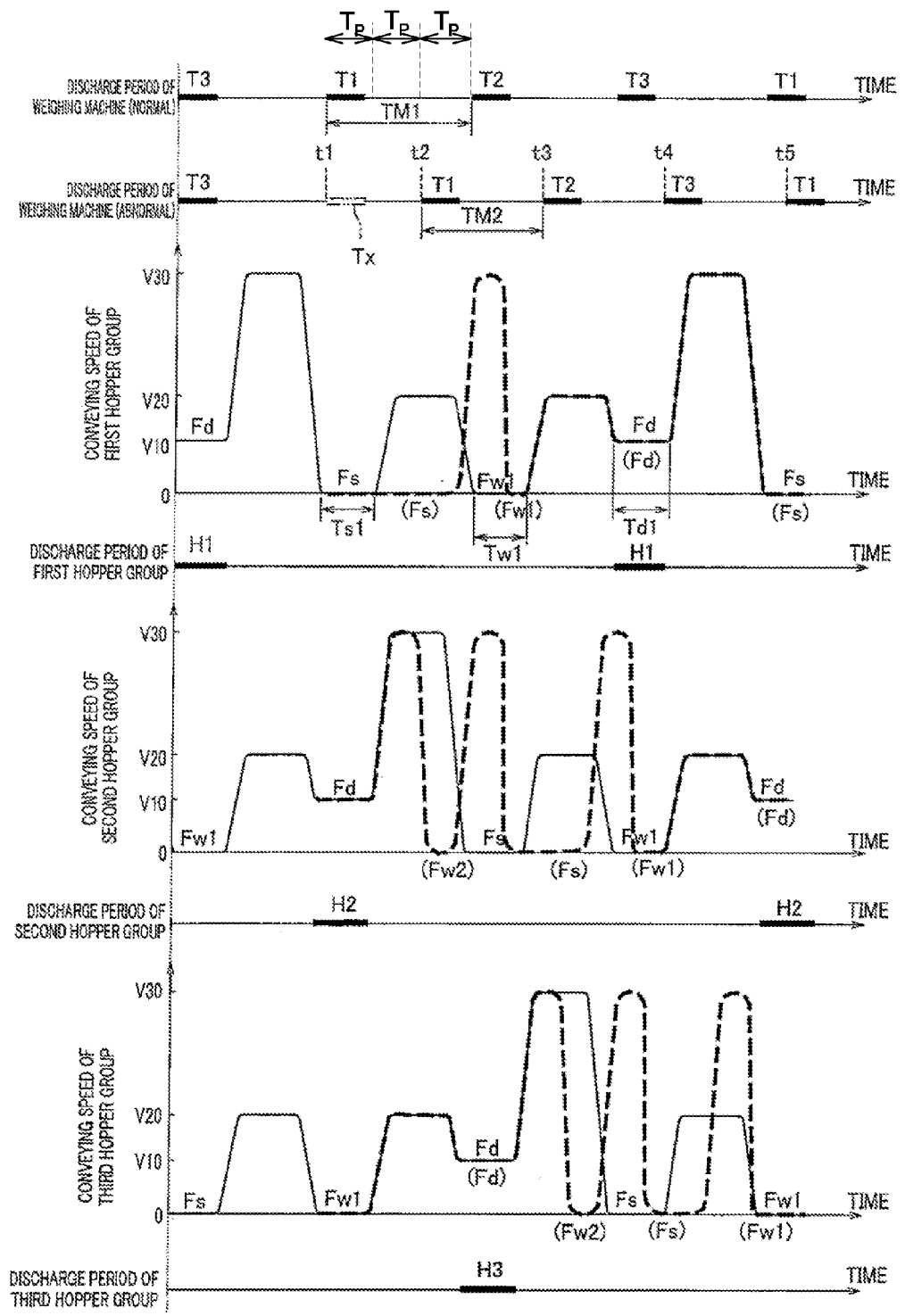
FIG. 6 is a timing chart showing an example of the operation of the weighing machine and the operation of the link apparatus in the case of using the link apparatus shown in FIGS. 5(a) and 5(b).

FIG. 6 is a timing chart showing an example of the operation of the weighing machine 10 and the operation of the link apparatus in a weighing and packaging system using the link apparatus shown in FIG. 5. Here it is supposed that the packaging machine 20 operates in a fixed operation cycle (Tp: manufacture time for one package bag).

Hereinafter, the three hoppers 33 attached to the hopper retaining members 94 are referred to as a first hopper group, the three hoppers 33 attached to the hopper retaining members 95 are referred to as a second hopper group, and the three hoppers 33 attached to the hopper retaining members 96 are referred to as a third hopper group.

First, a case of "discharge period (normal) of weighing machine" will be described. In this case, the operation of the weighing machine is normal, and the weighing machine discharges the objects to be weighed in a fixed operation cycle TM1. Since the objects to be weighed corresponding to three package bags are discharged in one discharge period of the weighing machine, the operation cycle TM1 of the weighing machine is a period which is three times as long as the operation cycle (Tp) of the packaging machine 20. The conveying speeds of the first, second, and third hopper groups in the case of "discharge period (normal) of weighing machine" are indicated by solid lines.

Initially, the operation of the first hopper group will be described. In a period Ts1, the first hopper group is in a stopped state in the reserving area Fs, and in this period, the weighing machine 10 discharges the objects to be weighed thereto (discharge period T1 of the weighing machine). After the period Ts1, the first hopper group is conveyed to the first stand-by area Fw1 at a speed V20 higher than a speed V10. Then, in a period Tw1, the first hopper group is in a stopped state. After the period Tw1, the first hopper group is conveyed to the package bag charging area Fd at the speed V20 higher than the speed V10. In a following period Td1, the first hopper group is conveyed at the speed V10 and the hoppers 33 open the gates to discharge the objects to be weighed in the package bag charging area Fd (discharge period H1 of the first hopper group). Then, the first hopper group is conveyed to the reserving area Fs at a speed V30 higher than the speed V10 and stopped there. Thereafter, the similar operation is repeated.

The second hopper group and the third hopper group operate as in the first hopper group. The first hopper group, the second hopper group, and the third hopper group operate at different timings. In the example of shown in FIG. 6, when the first hopper group is in the reserving area Fs, the second hopper group is in the package bag charging area Fd and the third hopper group is in the first stand-by area Fw1. When the first hopper group moves from the reserving area Fs to the first stand-by area Fw1 and to the package bag charging area Fd, the second hopper group moves from the package bag charging area Fd to the reserving area Fs and to the first stand-by area Fw1, and the third hopper group moves from the first stand-by area Fw1 to the package bag charging area Fd and to the reserving area Fs.

Subsequently, a case of "discharge period (abnormal) of weighing machine" will be described. The weighing machine is operable in an operation cycle TM2 which is shorter than the above described operation cycle TM1.

In the case where the operation of the weighing machine is normal, the weighing machine discharges the objects to be weighed in the period Tx starting from time t1. But, if the weighing machine cannot be ready for discharging before the time t1, it cannot discharge the objects to be weighed in the period Tx. Now, it is assumed that the weighing machine cannot be ready for discharging in time and is allowed to be ready for discharging at time t2. In the case where the weighing machine cannot be ready for discharging in time, the operation of the link apparatus, in particular, the conveying operation of the first, second and third hopper groups is controlled so that the objects to be weighed are discharged in a shorter operation cycle TM2. The conveying speeds of the first, second, and third hopper groups in the case of "discharge period (abnormal) of weighing machine" are indicated by broken lines.

In this case, the first hopper group which should have been supplied with the objects to be weighed at time t1 if the operation of the weighing machine is normal, stays in the reserving area Fs, and is supplied with the objects to be weighed in the discharge period T1 of the weighing machine starting from time t2. Thereafter, the first hopper group is conveyed to the first stand-by area Fw1 at the high speed V30.

The second hopper group which stayed in the package bag charging area Fd at time t1, discharges the objects to be weighed in the package bag charging area Fd (discharge period H2), and then is conveyed to the second stand-by area Fw2 at the high speed V30. Thereafter, when the first hopper group exits the reserving area Fs as described above, the second hopper group is conveyed to the reserving area Fs at the high speed V30 and then is supplied with the objects to be weighed at the discharge period T2 of the weighing machine starting from time t3.

The third hopper group which stayed in the first stand-by area Fw1 at time t1, is conveyed to the package bag charging area Fd as in the case where the operation of the weighing machine is normal, and discharges the objects to be weighed (discharge period H3). Thereafter, the third hopper group is conveyed to the second stand-by area Fw2 at the high speed V30.

The first hopper group is conveyed to the first stand-by area Fw1 as described above, and then is conveyed to the package bag charging area Fd as in the case where the operation of the weighing machine is normal, and discharges the objects to be weighed (discharge period H1). Thereafter, the first hopper group is conveyed to the reserving area Fs.

When the discharge period T2 of the weighing machine starting from time t3 ends, the second hopper group is conveyed from the reserving area Fs to the first stand-by area Fw1 at the high speed V30. Thereafter, the second hopper group is conveyed to the package bag charging area Fd and discharges the objects to be weighed (discharge period H2).

When the second hopper group exits the reserving area Fs as described above, the third hopper group is conveyed from the second stand-by area Fw2 to the reserving area Fs at the high speed V30, and then is supplied with the objects to be weighed in the discharge period T3 of the weighing machine starting from time t4. Thereafter, the third hopper group is conveyed to the first stand-by area Fw1 at the high speed V30.

Through the above procedure, at a time point of time t5, the first to third hopper groups are present in the same areas as those in the case where the operation of the weighing machine is normal. The discharge period T1 of the weighing machine starting from time t5 is slightly retarded with respect to the discharge period in the case where the operation of the weighing machine is normal, but a next discharge period (not shown) of the weighing machine is the same as that in the case where the operation of the weighing machine is normal. The retard of the discharge period T1 of the weighing machine starting from time t5 is eliminated by shortening the time when the first hopper group having been supplied with the objects to be weighed in the discharge period T1 next stays in the first stand-by area Fw1. After that, the hopper group operate as in the case where the operation of the weighing machine is normal.

As described above, by providing three hopper groups in the link apparatus, and providing one stand-by area in each of a conveying path from the reserving area Fs to the package bag charging area Fd and a conveying path from the package bag charging area Fd to the reserving area Fs, it is possible to achieve an advantage that the objects to be weighed can be supplied to the packaging machine without retard even if the discharge operation of the weighing machine is retarded.

In the same manner, four or more hopper groups may be provided. By increasing the number of hopper groups, the objects to be weighed can be supplied to the packaging machine without retard even if the discharge operation of the weighing machine is retarded for a longer time (although the size of the link apparatus increases). Therefore, the above described advantage is achieved by setting the number of the hopper groups to (2+m) (m: positive integer) and by providing m stand-by areas (areas where m hopper groups can stay) in each of the conveying path from the reserving area Fs to the package bag charging area Fd and the conveying path from the package bag charging area Fd to the reserving area Fs.

Whereas in the above described configuration, the weighing machine 10 discharges the objects to be weighed simultaneously through the three discharge outlets 10a, 10b and 10c, it may discharge the objects to be weighed sequentially through the three discharge outlets 10a, 10b, and 10c.

Figure 7:
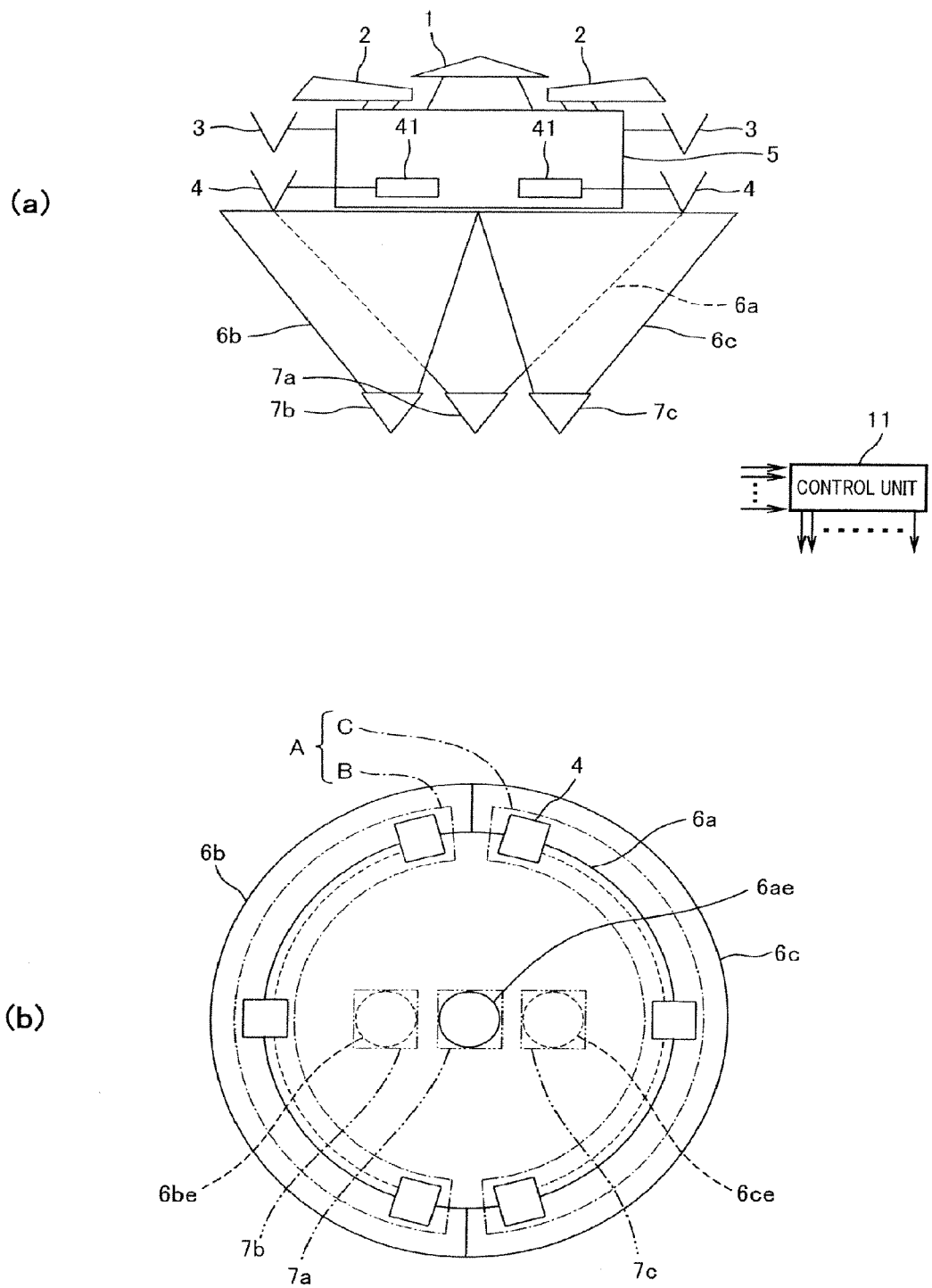
FIG. 7(a) is a schematic view of a weighing machine having three discharge outlets as viewed from the side, which is partly in cross-section.
FIG. 7(b) is a schematic view of an inner chute, outer chutes, and weighing hoppers of the weighing machine as viewed from above.

FIG. 7 shows an example of the weighing machine 10 which is used with the link apparatus shown in FIG. 5 and has three discharge outlets.

FIG. 7(a) is a schematic view of the weighing machine 10 having three discharge outlets as viewed from the side, which is partly in cross-section, and FIG. 7(b) is a schematic view of collecting chutes (an inner chute and two outer chutes), and weighing hoppers of the weighing machine 10 as viewed from above.

The weighing machine 10 is a combination weigher. The weighing machine is identical to the weighing machine shown in FIG. 4 in the dispersion feeder 1, the linear feeders 2, the feeding hoppers 3, the weighing hoppers 4, the weight sensors 41 and the center base body 5. It should be noted that the linear feeders 2, the feeding hoppers 3 and the weighing hoppers 4 are arranged in a circular shape.

Below the weighing hoppers 4 arranged in the circular shape, an inner chute 6a having a substantially inverted truncated cone shape is disposed, and two outer chutes 6b and 6c being divided two parts and having upper openings concentric with the inner chute 6a are arranged around the inner chute 6a. Each weighing hopper 4 is configured to have a gate for discharging the objects to be weighed to the inner chute 6a and a gate for discharging the objects to be weighed to the outer chute 6b or 6c to selectively discharge the objects to be weighed to the inner chute 6a or to the outer chute 6b or 6c located therebelow.

A group B of the weighing hoppers 4 disposed above the outer chute 6b is a group corresponding to the outer chute 6b and a group C of the weighing hoppers 4 disposed above the outer chute 6c is a group corresponding to the outer chute 6c. Each of the groups includes, for example, nine or ten weighing hoppers 4. A group A including the weighing hoppers 4 belonging to the group B and the group C is a group of the weighing hoppers 4 corresponding to the inner chute 6a. Collecting hoppers 7a, 7b and 7c are disposed at discharge outlets 6ae, 6be, and 6ce at the bottom parts of the inner chute 6a and the outer chutes 6b and 6c, respectively. The objects to be weighed which have been discharged from the weighing hoppers 4 to the chutes 6a, 6b, and 6c are held for some time in the associated collecting hoppers 7a, 7b and 7c and are respectively thereafter discharged.

The control unit 11 controls the operation of the entire combination weigher and the operation of the link apparatus, and performs the combination process. In the combination process, the control unit 11 determines the combination (discharge combination) of the weighing hoppers 4 for discharging the objects to be weighed to each of the inner chute 6a and the outer chutes 6b and 6c. Each discharge combination is a combination of the weighing hoppers 4 in which a total of the weight values of the objects to be weighed falls within a predetermined weight range (allowable range with respect to a target weight value). For example, the control unit 11 performs combination calculation based on the weight values (measurement values obtained using the weight sensors 41) of the objects to be weighed inside the weighing hoppers 4 in the group B disposed above the outer chute 6b to determine a discharge combination of the weighing hoppers 4 in which a total of the weight values of the objects to be weighed falls within a predetermined weight range (allowable range with respect to a target weight value) and is closest to the target weight value, as the discharge combination for discharging the object to be weighed to the outer chute 6b. In the same manner, the control unit 11 performs combination calculation based on the weight values of the objects to be weighed inside the weighing hoppers 4 in the group C disposed above the outer chute 6c to determine a discharge combination for discharging the objects to be weighed to the outer chute 6c. Furthermore, in the same manner, the control unit 11 performs combination calculation based on the weight values of the objects to be weighed inside the weighing hoppers 4 which belong to the group A made up of the whole weighing hoppers 4 and which are other than those in the groups B and C which have been selected to form the discharge combinations, to determine a discharge combination for discharging the objects to be weighed to the inner chute 6a.

In the manner as described above, the control unit 11 performs the combination process to determine the three discharge combinations simultaneously. The control unit 11 causes the weighing hoppers 4 corresponding to the respective discharge combinations to respectively discharge the objects to be weighed to the inner chute 6a and to the outer chutes 6b and 6c simultaneously. As a result, the objects to be weighed are supplied to the collecting hoppers 7a, 7b and 7c.

Then, the control unit 11 causes the collecting hoppers 7a, 7b, and 7c to discharge the objects to be weighed simultaneously at a specified timing.

The collecting hoppers 7b, 7a and 7c of the combination weigher serve as the three discharge outlets of the weighing machine 10 (e.g., discharge outlets 10a, 10b, and 10c shown in FIG. 5). The objects to be weighed which have been discharged from the collecting hoppers 7a, 7b and 7c are supplied to the respective hoppers 33, for example, in the reserving area Fs of the link apparatus shown in FIG. 5.

Whereas the combination weigher is configured to determine the three discharge combinations simultaneously, it may be configured to sequentially determine the discharge combination for discharging the objects to be weighed to the outer chute 6b, the discharge combination for discharging the objects to be weighed to the inner chute 6a, and the discharge combination for discharging the objects to be weighed to the outer chute 6c, to cause the weighing hoppers 4 belonging to the respective discharge combinations to sequentially discharge the objects to be weighed, and to cause the collecting hoppers 7b, 7a, and 7c to sequentially discharge the objects to be weighed.

In a case where the number of hoppers in each hopper group of the link apparatus is set to four or more, the number of the discharge outlets of the weighing machine is set to four or more which are as many as the hoppers in each hopper group.

For example, in the case of the weighing machine 10 having four discharge outlets, it is supposed that in the configuration shown in FIG. 7, the inner chute 6a is divided into two chutes (hereinafter referred to as "first and second inner chutes") respectively corresponding to the outer chutes 6b and 6c and respectively having their discharge outlets, and the collecting hoppers are respectively provided at the discharge outlets of the first and second inner chutes. To be specific, the group B of the weighing hoppers 4 is a group corresponding to the first inner chute and the outer chute 6b, while the group C of the weighing hoppers 4 is a group corresponding to the second inner chute and the outer chute 6c. In the combination process, two discharge combinations are selected from the group B of the weighing hoppers 4, one of the discharge combinations is determined as a discharge combination for discharging the objects to be weighed to the first inner chute, and the other discharge combination is determined as a discharge combination for discharging the objects to be weighed to the outer chute 6b. In addition, two discharge combinations are selected from the group C of the weighing hoppers 4, one of the discharge combinations is determined as a discharge combination for discharging the objects to be weighed to the second inner chute, and the other discharge combination is determined as a discharge combination for discharging the objects to be weighed to the outer chute 6c.

In the manner as described above, the control unit 11 performs the combination process to determine the four discharge combinations simultaneously. The control unit 11 causes the weighing hoppers 4 corresponding to the respective discharge combinations to discharge the objects to be weighed to the first and second inner chutes and to the outer chutes 6b and 6c simultaneously. As a result, the objects to be weighed are supplied to the four collecting hoppers.

Then, the control unit 11 causes the four collecting hoppers to discharge the objects to be weighed simultaneously at a specified timing.

The four collecting hoppers of the combination weigher serve as the four discharge outlets of the weighing machine 10. The objects to be weighed which have been discharged from the four collecting hoppers are supplied to the four hoppers 33 of the link apparatus in the reserving area. Thereafter, in the package bag charging area, the hoppers 33 charge the objects to be weighed to the package bags through the feeding funnels 23 of the packaging machine. Also, in this case, the four discharge configurations may be sequentially determined, the weighing hoppers 4 corresponding to the respective discharge combinations may sequentially discharge the objects to be weighed, and the four collecting hoppers may sequentially discharge the objects to be weighed.

In the above embodiments, the configuration of the weighing machine or the like may be altered in various ways. One example will be described below.

For example, the combination weigher may be configured such that the collecting hoppers are not provided at the discharge outlets of the collecting chutes (inner chute, outer chute). In this case, the discharge outlet of the collecting chute serves as the discharge outlet of the weighing machine, and the objects to be weighed which have been discharged from the weighing hoppers 4 selected to form the discharge combination slide down on the collecting chute and are directly supplied to the hoppers 33.

In the examples of FIG. 4 and FIG. 7, the combination weigher is configured to have only the weighing hoppers 4 as the hoppers (combination hoppers) which are used in the combination calculation. However, the configuration of the hoppers used in the combination calculation may be changed in various ways so long as the hoppers are configured to discharge the objects to be weighed whose total weight value falls within a predetermined weight range. In one example of the configuration of the hoppers, memory hoppers may be provided below the weighing hoppers 4 to respectively correspond to the weighing hoppers 4, and may be fed with the objects to be weighed which have been weighed from the associated weighing hoppers 4, and each of the weighing hoppers 4 may be configured to selectively discharge the objects to be weighed to the associated memory hopper or to the collecting chute. In this case, the control unit 11 of the combination weigher may perform the combination calculation based on the weight values of the objects to be weighed which are held in the respective weighing hoppers 4 and the weight values of the objects to be weighed which are held in the respective memory hoppers, to determine a combination of the weighing hoppers 4 and/or the memory hoppers in which a total of the weight values of the objects to be weighed falls within a predetermined weight range and may determine it as the discharge combination.

Whereas in the above described combination weigher, the combination hoppers used in the combination are arranged in a circular shape, the configuration of the combination hoppers is not limited to this. For example, the combination hoppers may be arranged in an oval shape, a polygon shape such as a square shape or a rectangular shape, or in a straight-line shape.

The combination weigher may be replaced by a weighing machine configured to weigh the objects to be weighed and to discharge the objects to be weighed from respective of plural discharge outlets.

The weighing machine such as the combination weigher may be configured to have a single discharge outlet for the objects to be weighed, and plural weighing machines may be configured to respectively discharge the objects to be weighed to the plural hoppers 33.

Whereas in the link apparatus in the above embodiment, the hopper group is stopped in the reserving area Fs, it may be conveyed at a speed lower than a conveying speed of the hopper group in the package bag charging area Fd so long as the objects to be weighed which have been discharged from the weighing machine can be supplied to the hoppers 33 without spilling out of the hoppers 33. In this case, it is desirable to increase the length of the upper opening of each hopper 33 for receiving the objects to be weighed in the conveying direction of the hopper, because the time for receiving the objects to be weighed can be made longer.

In a case where the stand-by areas (first stand-by area Fw1 and second stand-by area Fw2) are provided as shown in FIG. 5, the hopper group is stopped in the stand-by areas. Alternatively, the hopper group may be conveyed at a speed lower than the conveying speed in the package bag charging area Fd or at a speed equal to the conveying speed in the package bag charging area Fd. For example, a hopper group which exited the reserving area Fs may catch up with a preceding hopper group, and then may enter the package bag charging area Fd after the preceding hopper group at a speed equal to the conveying speed in the package bag charging area Fd. In this case, the first stand-by area Fw1 becomes an area immediately before the package bag charging area Fd. In addition, the second stand-by area Fw2 may become an area immediately before the reserving area Fs.

In the above described embodiment, the reserving area Fs may be divided into plural areas. For example, in the link apparatus shown in FIG. 5, the reserving area Fs may be divided into two reserving areas (Fs1, Fs2). For example, in the first reserving area Fs1, one of three hoppers 33 forming the hopper group is supplied with the objects to be weighed, and the remaining two hoppers 33 may be supplied with the objects to be weighed in the following second reserving area Fs2. In this case, for example, a weighing machine having a single discharge outlet is disposed above the first reserving area Fs1 and a weighing machine having two discharge outlets may be disposed above the second reserving area Fs2, allowing these weighing machines to respectively supply the objects to be weighed to the hoppers 33. In the same manner, the reserving area Fs may be divided into three reserving areas, and one hopper 33 may be supplied with the objects to be weighed in each reserving area. In this case, for example, a weighing machine having a single discharge outlet may be disposed above each reserving area and each hopper 33 may be supplied with the objects to be weighed. In the link apparatus shown in FIG. 1, the reserving area Fs may be divided into two reserving areas in the same manner. In the case where the reserving area is divided into plural areas as described above, the hopper group may be stopped in the divided reserving areas or may be conveyed at a speed lower than the conveying speed of the hopper group in the package bag charging area Fd in the manner described above.

Whereas in the above embodiment, all of the hoppers 33 (e.g., two hoppers 33 in the example of FIG. 1, three hoppers 33 in the example of FIG. 5) belonging to a hopper group discharge the objects to be weighed simultaneously, upon entering the package bag charging area Fd, the hoppers 33 may sequentially discharge the objects to be weighed in the order in which they enter the package bag charging area Fd.

In the above described embodiment, the control unit 11 of the weighing machine may be configured to control the link apparatus. In this case, a weighing apparatus configured to include the link apparatus and the weighing machine is provided. Alternatively, the link apparatus may be configured to be controlled by the packaging machine control unit 20A rather than the control unit 11 of the weighing machine. In this case, a packaging apparatus configured to include the link apparatus and the packaging machine is provided.

The control unit 11 of the weighing machine and the packaging machine control unit 20A are each constituted by, for example, a microcomputer. These control units need not be each constituted by a single controller but may be constituted by plural controllers which are distributed and cooperate to control the operation of the weighing apparatus.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is useful as a link apparatus capable of supplying objects to be weighed which have been discharged from a weighing machine having a discharge outlet in a fixed position, to package bags being conveyed successively at a high speed, a weighing apparatus using the link apparatus, a packaging apparatus using the link apparatus, and a weighing and packaging system using the link apparatus.

The invention claimed is:

1. A link apparatus comprising:
plural hopper groups each including n (n: plural number) hoppers for holding objects to be weighed which are supplied to the hoppers and discharging the objects to be weighed; and
plural conveyor means which are provided to respectively correspond to the hopper groups and are respectively configured to convey the corresponding hopper groups such that the hoppers belonging to each hopper group are arranged in one line in a direction along a revolving path including a first area where the objects to be weighed are supplied to the n hoppers belonging to the hopper group and a second area under which package bags arranged in one line in the direction along the revolving path are conveyed successively, the first area being a part of the revolving path and the second area being another part of the revolving path;
wherein
the conveyor means are respectively configured to convey the hopper groups such that the hopper groups are repeatedly conveyed from the first area to the second area in a predetermined order;
the conveyor means are respectively configured to convey associated hopper groups such that the n hoppers in each of the hopper groups sequentially conveyed to the second area are respectively located above n package bags, the n package bags sequentially conveyed to a region under the second area; and
the conveyor means are respectively configured to convey the hopper groups such that the n hoppers in each of the hopper groups are respectively located above the n package bags in the second area;
the conveyor means are respectively configured to stop the hopper groups in the first area or convey the hopper groups in the first area at a speed lower than a speed in the second area; and
wherein the hopper groups are each configured to discharge the objects to be weighed from the n hoppers to the n package bags respectively located below the n hoppers, when the hopper groups are conveyed in the second area.

2. The link apparatus according to claim 1, wherein the number of the hopper groups is three or more and the number of the conveyor means is three or more.

3. The link apparatus according to claim 1, wherein the n hoppers in each hopper group are mounted to the conveyor means such that the hoppers are arranged at a pitch equal to a pitch of the package bags arranged, in the direction along the revolving path.

4. The link apparatus according to claim 1, wherein the conveyor means is configured to convey the hopper groups at a speed equal to a speed at which the package bags are conveyed in the second area.

5. A weighing apparatus comprising:
the link apparatus according to claim 1; and
a weighing machine having n discharge outlets disposed above the first area of the link apparatus, the weighing machine being configured to discharge the objects from the respective discharge outlets to supply the objects to the hoppers in each of the hopper groups which are conveyed sequentially to the first area of the link apparatus.

6. The weighing apparatus according to claim 5, wherein the weighing machine is configured to divide the objects into plural groups and weigh the objects for each of the plural groups, determine n combinations each having a total weight falling within a predetermined weight range, from the groups, and configured to discharge, from the n discharge outlets, the objects in the groups which are selected to form the n combinations.

7. A packaging apparatus comprising:
the link apparatus according to claim 1; and
a packaging machine which successively conveys the package bags arranged in one line under the second area of the link apparatus.

8. A weighing and packaging system comprising:
the link apparatus according to claim 1;
a weighing machine having n discharge outlets disposed above the first area of the link apparatus, the weighing machine being configured to discharge the objects to be weighed which have been weighed from the respective discharge outlets to supply the objects to be weighed to the hoppers in each of the hopper groups which are conveyed sequentially to the first area of the link apparatus; and
a packaging machine which successively conveys the package bags arranged in one line under the second area of the link apparatus.

9. The weighing and packaging system according to claim 8, wherein
the packaging machine includes plural funnels which are conveyed under the second area of the link apparatus in a state where the funnels are respectively inserted into the package bags and guide the objects to be weighed which have been discharged from the hoppers of the link apparatus to inside of the package bags.

* * * * *